Aug. 26, 1958    R. E. JOHNSON    2,848,963
MEANS FACILITATING THE CONTROL AND OPERATION OF
ORNAMENTAL STITCH SEWING MACHINES
Filed June 15, 1956    2 Sheets-Sheet 1

WITNESS
William Martin

INVENTOR.
Ralph E. Johnson
BY
Marshall J. Breen
ATTORNEY

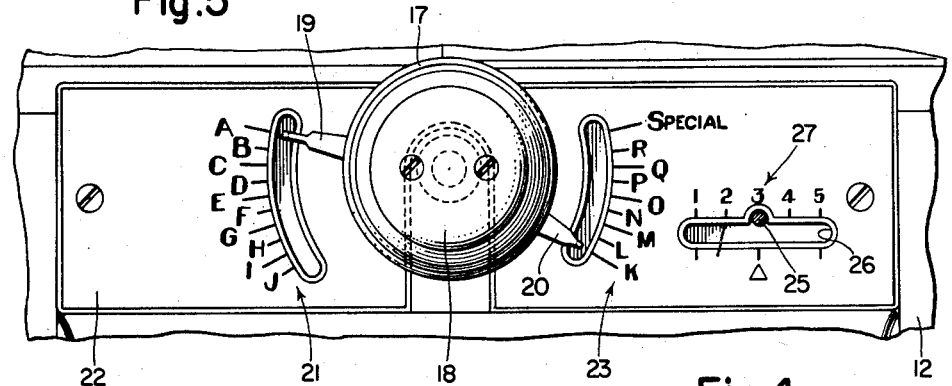
Fig.5
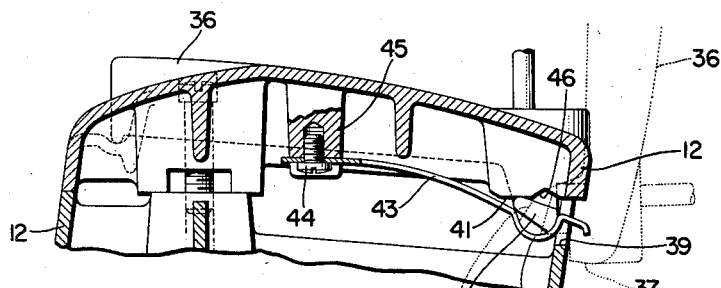
Fig.4
Fig.3
INVENTOR
Ralph E. Johnson

United States Patent Office 2,848,963
Patented Aug. 26, 1958

2,848,963
MEANS FACILITATING THE CONTROL AND OPERATION OF ORNAMENTAL STITCH SEWING MACHINES

Ralph E. Johnson, Mountainside, N. J., assignor to The Singer Manufacturing Company, Elizabeth, N. J., a corporation of New Jersey Application June 15, 1956, Serial No. 591,718

1 Claim. (Cl. 112—158)

This invention relates to ornamental stitch sewing machines of the type having one or more manually controllable handles for the purpose of regulating the character and pattern of the sidewise needle movements. In machines of this type difficulty has in the past been experienced in properly correlating the settings of the control handles in order to have the machine produce the desired ornamental stitch patterns.

It is the primary purpose of this invention to overcome the above noted shortcoming by the provision of means which, when applied to the machine in the manner hereinafter disclosed, will facilitate the manual control and adjustment of the machine.

With the above and other objects in view, the invention comprises the devices, combinations and arrangements of parts hereinafter described in connection with the accompanying drawings which illustrate a preferred embodiment of the invention from which the several features of the invention and the advantages attained thereby will be readily understood by those skilled in the art.

In the drawings:

Fig. 3 represents, on an enlarged scale, a fragmentary sectional view taken substantially along the line 3—3 of Fig. 2.

Fig. 4 represents, on an enlarged scale, a portion of the sewing machine bracket-arm carrying certain handles for controlling the ornamental stitch patterns produced by the sewing machine, as well as an indicia plate associated with such handles.

Fig. 5 represents, on an enlarged scale, an instruction plate of the type illustrated in Fig. 1 as being secured to the interior portion of the top cover plate of the sewing machine.

Figure 1:
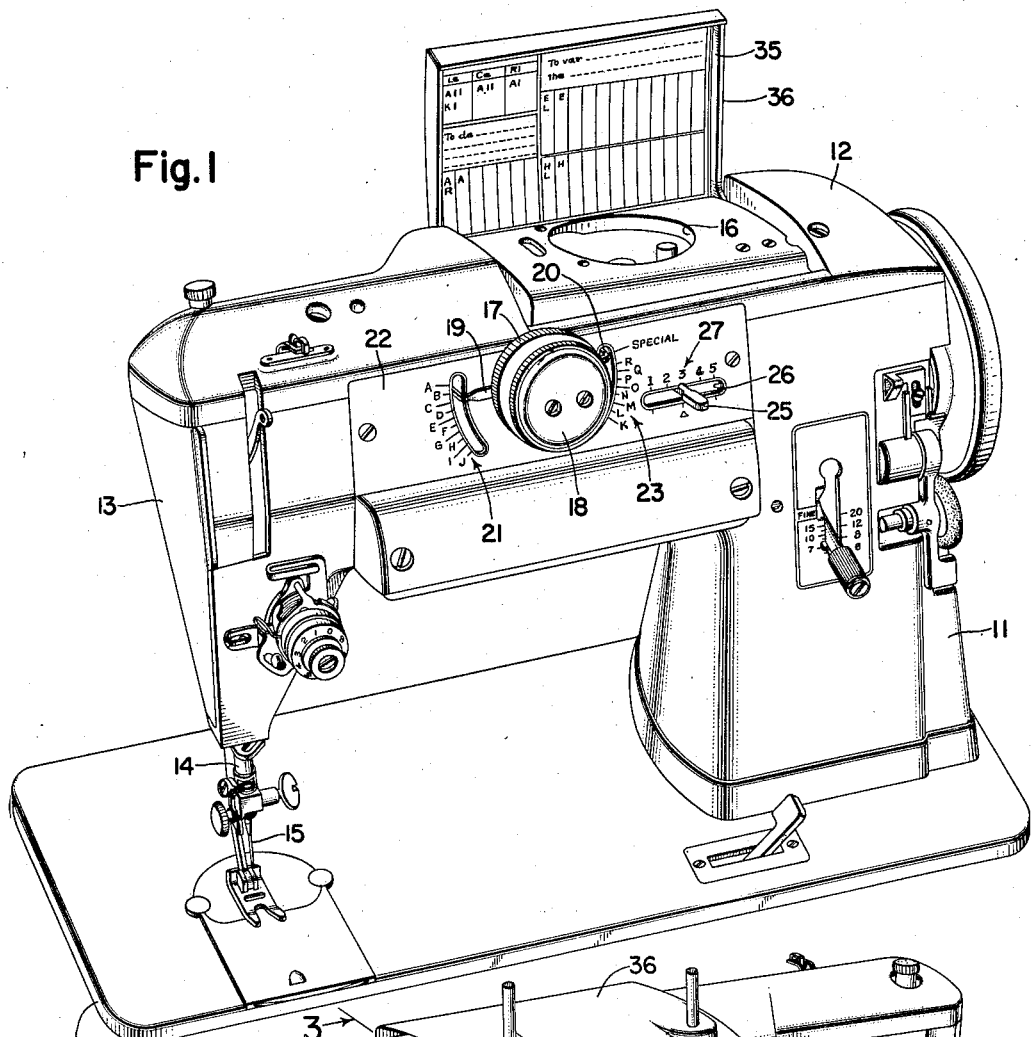
Fig. 1 represents a front perspective view of a sewing machine in which the present invention is embodied.

The following detailed description has to do with a construction of a sewing machine of the type disclosed in my copending application Serial No. 471,766, filed November 29, 1954, of which this application is a continuation-in-part.

As illustrated in the drawings, the frame of the sewing machine in which the present invention is incorporated comprises a substantially rectangular shaped base 10 upon which is mounted a vertically disposed hollow standard 11 carrying an overhanging hollow bracket-arm 12 terminating in a hollow head 13 in which is mounted for endwise reciprocation and for sidewise movements transversely of the direction of reciprocation a needle-bar 14 carrying a conventional needle 15. The hollow sewing machine frame including the upright standard 11, the overhanging bracket-arm 12 and the head 13 contains mechanism which automatically reciprocates the needle-bar 14 in a substantially vertical direction and at the same time, if desired, shifts the needle-bar 14 longitudinally of the bracket-arm 12 in the manner of an ornamental stitching machine thereby to produce what are commonly called "zigzag stitches." For further details relating to the specific structure of this type of machine, reference may be had to my copending United States patent application Serial No. 471,766, filed November 29, 1954.

As is best disclosed in my above identified copending application, the bracket-arm 12 is hollow and is formed at its upper portion with access opening 16 providing a passageway through which various pattern cams may be inserted into or removed from the sewing machine driving mechanism, which pattern cams control the sidewise or zigzag stitch movements of the needle-bar 14.

As further shown in my copending application, the bracket-arm 12 is provided with a plurality of such pattern cams and with mechanism whereby any one of the cams may be selectively connected with the needle-bar 14 for the purpose of imparting selected predetermined patterns of movement to the needle 15.

Referring particularly to Fig. 1, the cam-selecting mechanism is adapted to be manually controlled by means of two operator-influenced handles 17 and 18 which are provided respectively with pointers 19 and 20 for the purpose of giving a visual indication as to the angular adjustment of the handles 17 and 18. These handles are mounted for turning movements about a common central axis. More specifically, the handle 17 is adapted to be turned in a manner such that its pointer 19 will traverse a set of indicia, generally designated by the numeral 21, which is provided upon the forward exposed face 22 of the bracket-arm 12. As illustrated in Figs. 1 and 4, the set of indicia 21 comprises the letters A to J, inclusive.

The handle 18, like the handle 17, is adapted to be turned with its pointer 20, which tracks a second set of indicia 23 also formed on the exposed front face 22 of the bracket-arm 12. The set of indicia 23 comprises the letters R to K, inclusive. From this it is to be understood that by turning the handles 17 and 18 so that their associated pointers will be respectively disposed opposite an indicium of their associated indicia sets 21 and 23 the cam-selecting mechanism disposed within the bracket-arm 12 will automatically be adjusted to select predetermined cams for actuating the needle-bar 14 in a predetermined pattern for sidewise movements.

Still referring to Fig. 1, the forward exposed face of the bracket-arm 12 is provided with another operator-influenced handle 25 which extends through an aperture 26 provided in the bracket-arm so as to be connected with the stitch-regulating mechanism disposed within the bracket-arm. The arm 25 is adapted to be shifted in a horizontal direction within the confines of the slot 26 and has two functions of which the first is to provide conveniently controllable means for determining a neutral position of non-vibration of the needle 14 at the center or at either side of the field of lateral throw of the needle whereby the needle may be caused to perform straight stitching on a center line through the field or along a line disposed entirely at either of the two sides of the field. Also by the use of this means as well as the various cams, the needle can be caused to vibrate laterally from zero to maximum either across a center line through the field or entirely from either of the sides of the field.

Associated with the handle 25 is a third indicia set generally designated by the numeral 27, which indicia set comprises the numerals 1 to 5, inclusive. It is to be understood that when the handle 25 is disposed opposite the numeral 3 the needle 15 is disposed so as to perform either straight stitches along a center line through the field or zigzag stitches which are disposed at equal distances on either side of such center line. Also, as the handle 25 is shifted either to the left or to the right of the numeral 3 it will cause the needle to vibrate wholly at either the left or the right of the center line.

From the above it is to be understood that the operator by manipulating the handles 17, 18 and 25 may cause the sewing machine needle-bar 14 to vibrate laterally in various selected patterns.

It is the purpose of the present invention to provide means for assisting the operator in properly and conveniently adjusting the handles 17, 18 and 25 in a manner such that various predetermined patterns of ornamental stitching will be performed by the sewing machine.

For so facilitating the adjustment of the various handles 17, 18 and 25 the frame 12 is provided, in a manner as will hereinafter be described in further detail, with an instruction plate which is best disclosed in Fig. 5. This instruction plate includes boxes generally designated in Fig. 5 by the numerals 30, 31, 32 and 33. Each of these four boxes is provided with pictorial representations of various stitch patterns produceable by the needle 14 and adjacent each one of these pictorial representations are indicia which correspond to the various sets of indicia 21, 23 and 27 formed on the face of the bracket-arm so as to represent the particular handle settings necessary to make the machine produce the associated illustrated stitch pattern.

For example, by referring to Figs. 4 and 5, and particularly to box 30 of the plate, there are illustrated three stitch patterns. Associated for example with that pattern at the extreme left-hand side of the box 30 are the letters A and K and the numeral 1 with the letter A corresponding to the letter A of the indicia set 21, K corresponding to the K of indicia set 23 and the numeral 1 corresponding to the numeral 1 of indicia set 27. By thus referring to box 30 the operator will immediately appreciate that in order to produce the chosen illustrated stitch pattern it is necessary to turn the handle 17 to the letter A on stitch set 21, turn the handle 18 to the letter K on stitch set 23 and shift the handle 25 to the numeral 1 on stitch set 27.

Also by referring to box 31, it will be observed that there are provided some seven pictorial representations of various stitch patterns and associated adjacent each of these pictorial representations are letters and numerals which correspond to those letters and numerals found in the indicia sets 21, 23 and 27. Thus, for example, referring to the stitch pattern shown in the extreme left-hand portion of this box 31 there is associated with such stitch pattern the letters A and R and the numeral 5 which would indicate that the handles 17, 18 and 25 should be shifted until their pointers are disposed respectively opposite the indicia A, R and 5 of their associated sets 21, 23 and 27 so as to make the machine produce the illustrated pattern.

Figure 2:
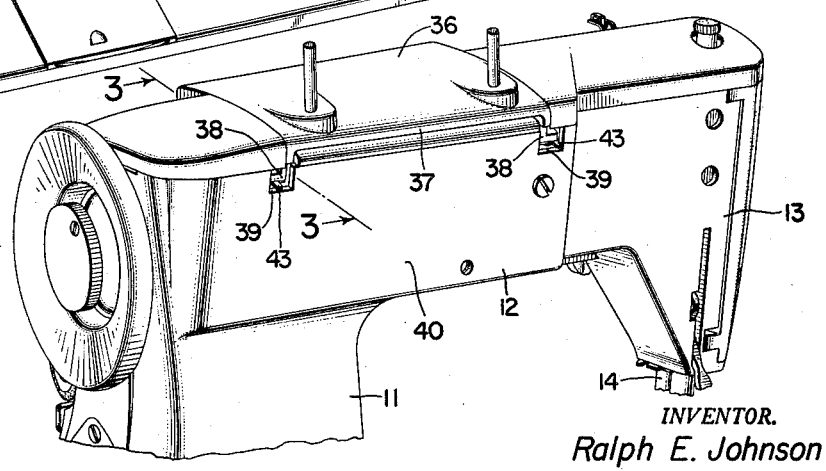
Fig. 2 represents a fragmentary rear perspective view of the sewing machine disclosed in Fig. 1.

Referring particularly to Fig. 1, it is to be understood that the instruction plate disclosed in Fig. 5 is provided upon the inner face 35 of a cover member 36 whose rear edge portion 37 is pivotally secured to the rear edge portion of the bracket-arm 12 in a manner such that the plate may be disposed in a substantially vertical position in order to expose the indicia and pictorial representations to the gaze of the operator and also so that the cover 36 may be swung downwardly into a horizontal position as disclosed in Fig. 2 in which position the cover is substantially disposed in a flush condition against the bracket-arm 12 and over the opening 16.

Referring to Figs. 2 and 3 the cover 36 is provided along its rear edge portion 37 with two hinge ears 38, 38 which are received within apertures 39, 39 formed in the rear face 40 of the bracket-arm 12. Each hinge 38 is formed in the shape of a cam, one portion of which is adapted to engage the stationary shoulder 41 formed on the under surface of the bracket-arm cover, while the under surface of the hinge ear 38 is embraced by a U-shaped portion 42 of a flat spring 43 one end of which is secured by means of a screw 44 to a boss 45 formed on the under surface of the bracket-arm cover. From Fig. 3, is will be appreciated that when the cover 36 is in its closed position the springs 43 engage the hinges 38 in a manner such as to force them against the abutment portions 41 and thereby releasably maintain the cover 36 in its closed position. However, when the cover 36 is shifted to its substantially vertical position as illustrated in solid lines of Fig. 1 and in dotted lines in Fig. 3, it will be appreciated that the springs 43 will then urge the ears 38 into slots 46 formed in the frame adjacent the abutment portion 41 so as releasably to maintain the cover 36 in its vertical position.

Referring to Fig. 1 and Fig. 2, the cover 36 forms a dual purpose, that is, its inner surface 35 carries the pictorial representations and indicia as illustrated in Fig. 5 in a manner such that they can be conveniently positioned within the view of the operator during the operation of the machine and at the same time the cover 36 functions as a means for giving access to the various cams disposed within the aperture 16 whenever such cams are to be changed. However, when the operator no longer wishes to observe the material on the plate the latter may be swung to its closed position and thereby function as a cover for the bracket-arm access opening 16.

Having thus set forth the nature of the invention, what I claim herein is:

In an ornamental stitch sewing machine having a hollow frame including an upright standard and a horizontally disposed bracket-arm, a needle mounted in the frame for endwise reciprocation and for sidewise movements transversely of the direction of reciprocation, a plurality of cams mounted for rotation within the frame, a cam-follower connecting a selected one of the cams with the needle for imparting sidewise movements to the needle, and means connected between the cam-follower and the needle for varying the reaction of the needle to a selected cam; the improvement which consists in the provision of a first handle connected with the cam follower for shifting the latter from one cam to another, a second handle connected with the last mentioned means for actuating the same, such two handles being shiftably carried by and exposed at the front face of the bracket-arm for conjointly regulating the pattern of sidewise needle movements, a distinctive set of indicia provided on the front face of the bracket-arm adjacent each of the two handles and representing different positions of adjustment of its associated handle, a plate having one edge thereof hinged to the rear top edge of the bracket-arm, means releasably maintaining the plate in either its closed horizontal position against the bracket-arm or in its open vertical position, a pictorial representation of each of a plurality of stitch patterns produceable by the needle provided on the inner face of the plate and indicia provided on the inner face of the plate adjacent each pattern representation and representing the particular handle settings necessary to produce the illustrated stitch pattern.

References Cited in the file of this patent
UNITED STATES PATENTS
2,713,838    Johnson et al. _____ July 26, 1955